United States Patent [19]

Van Brunt et al.

[11] Patent Number: 5,424,657
[45] Date of Patent: Jun. 13, 1995

[54] METHOD AND APPARATUS FOR IMPLEMENTING A COMMON MODE LEVEL SHIFT IN A BUS TRANSCEIVER INCORPORATING A HIGH SPEED BINARY DATA TRANSFER MODE WITH A TERNARY CONTROL TRANSFER MODE

[75] Inventors: Roger Van Brunt, San Francisco; Florin Oprescu, Sunnyvale, both of Calif.

[73] Assignee: Apple Computer, Inc., Cupertino, Calif.

[21] Appl. No.: 221,029

[22] Filed: Mar. 31, 1994

Related U.S. Application Data

[63] Continuation-in-part of Ser. No. 34,561, Mar. 19, 1993, Pat. No. 5,325,355.

[51] Int. Cl.[6] .............................................. H03K 17/30
[52] U.S. Cl. .......................................... 326/63; 326/82
[58] Field of Search ........................ 326/63, 82; 327/65, 327/68, 80

[56] References Cited

U.S. PATENT DOCUMENTS

| | | | |
|---|---|---|---|
| 4,904,953 | 2/1990 | McCormack | 330/258 |
| 5,105,099 | 4/1992 | Routh et al. | 307/270 |
| 5,179,586 | 1/1993 | Lee | 307/475 X |
| 5,317,214 | 5/1994 | Lewis | 307/475 |

Primary Examiner—David R. Hudspeth
Attorney, Agent, or Firm—Blakely, Sokoloff, Taylor & Zafman

[57] ABSTRACT

The level shifter provides a selective voltage level shift to a common mode signal level on a twisted pair signal line. The level shift is selectively performed based upon the input level of the common mode voltage. The level shifter is advantageously employed in a low voltage circuit wherein lacking sufficient voltage head room to accommodate a constant common mode level shift. An exemplary embodiment is described wherein the level shifter is employed within a bus transceiver of a bus system employing IEEE P1394 bus protocol. In the exemplary embodiment, the selective level shift is applied only to bus signals occurring during an idle phase and an arbitration phase, with no level shift performed during a data phase.

7 Claims, 9 Drawing Sheets

METHOD AND APPARATUS FOR IMPLEMENTING A COMMON MODE LEVEL SHIFT IN A BUS TRANSCEIVER INCORPORATING A HIGH SPEED BINARY DATA TRANSFER MODE WITH A TERNARY CONTROL TRANSFER MODE

BACKGROUND OF THE INVENTION

1. Related Applications

This is a continuation-in-part of U.S. patent application Ser. No. 08/034,561, filed Mar. 19, 1993, now U.S. Pat. No. 5,325,355 entitled "Method and Apparatus for Implementing a Common Mode Level Shift in a Bus Transceiver Incorporating a High Speed Binary Data Transfer Mode with a Ternary Control Transfer Mode" which is incorporated herein by reference.

2. Field of the Invention

The invention of the parent application relates to a bus architecture communications scheme for enabling baseband data communications between a plurality of interconnected devices or nodes in a computer system, and more particularly to a level shifter bus transceiver incorporating a high speed, binary transfer mode with a low speed, ternary control transfer mode having a full duplex dominant logic scheme for bi-directional, simultaneous signal transfer. The invention of the present application relates to an improved level shifter, particularly for use in a low voltage system such as a 3.3 V CMOS system.

3. Description of Related Application

A first embodiment of the invention of the parent application is shown in FIG. 1. Two pairs of bus transceivers 1, 22 and 2, 21 are interconnected via a twisted pair, serial bus 45 for the half duplex transmission of data signals and the full duplex transmission of control signals between nodes 51, 52. The twisted pair, serial bus 45 comprises two pairs of signal wires 40, 41 and 42, 43 with each pair forming a transmission channel 20 for the transmission of differential signals. During a data transfer phase on the bus 45 where data is transmitted from the first node 51 to the second node 52, the first pair of signal wires 40, 41 is used to transfer differential data signals while the second pair of signal wires 42, 43 is used to transfer differential clock signals between the two nodes 51, 52. Similarly, during a data transfer phase on the bus 45 where data is transmitted from the second node 52 to the first node 51, the first pair of signal wires 40, 41 is used to transfer differential clock signals while the second pair of signal wires 42, 43 is used to transfer differential data signals between the two nodes 51, 52. In an arbitration phase, however, the bus 45 is used in a full duplex mode (as a two bit parallel channel, for example) where both the first and second nodes 51, 52 transmit arbitration information simultaneously on both pairs of signal wires 40, 41 and 42, 43.

With reference to the first and second transceivers 1, 2 shown in FIG. 1, each comprises a differential driver 4 for driving differential signal states on the bus 45, a high speed binary receiver 5 for receiving high speed data signals and a ternary receiver 6 for receiving control signals. With reference to the transceivers 21 and 22, each similarly comprises a differential driver 4, a high speed binary receiver 5 and a ternary receiver 6. However, transceivers 21 and 22 additionally comprise a preemptive signaling receiver 7 to detect preemptive control messages superimposed on the clock signal wires by the respective receiving node during a data transfer phase for terminating the transfer of data upon receipt of such a message.

With respect to the binary data transfer mode, the binary receivers 5 comprise high speed receivers having a single voltage comparator 13 for reception of data signals transmitted via the transmission channel 20. The voltage comparators 13 translate the bus states 0 and 1 into the signal states 0 and 1 during the data transfer mode. During the bus arbitration phase, however, the receivers 5 are disabled since the control signals are received only by the ternary receivers 6.

Since the high speed, binary data transfer mode is only half-duplex, an arbitration scheme is required to determine the preferred direction of the binary data transfer. In the most general case, the negotiation to determine the preferred direction of the upcoming data transfer can involve all nodes connected to the bus. Because the exchange of control signals which implement the bus arbitration algorithm is made full duplex, the duration of the arbitration phase is reduced, thus maximizing the bus useful bandwidth. The dominant logic scheme implemented in the ternary receivers 6 enables the transceivers connected to the links 40 to simultaneously transmit and receive control information, thus reducing the minimum duration of the arbitration phase.

In the implementation of the dominant logic scheme in the ternary transfer mode, the ternary receiver 6 of a "data receiving" transceiver 21 utilizes two voltage comparators 11, 12 each able to output a binary value C responsive to the detected bus state B.

To permit the voltage comparators 11, 12, 13, 14 forming the receivers 5, 6, 7 to receive the transmitted signals at the amplitude required to detect the proper bus voltage values, a means is provided for common mode shifting of the signals at the front end of the receivers 5, 6, 7 while providing for a voltage offset independent of the fabrication process. The voltage drop that can occur across the ground connection between the two nodes 51,52 connected via bus 45 may cause the common mode value of the received signal amplitude to fall below the common mode range of the receivers 5, 6, 7. Therefore, to obtain the proper signal amplitudes required by the comparators 11, 12, 13, 14 and to optimize the common mode performance of the bus 45, a common mode level shift of approximately 650 mV is implemented at the front end of each receiver 5, 6, 7. The level shift is performed by providing each receiver 5,6,7 of the transceivers 1, 2, 21, 22 with the level shifting circuit 10 shown in FIG. 2 wherein the PNP bipolar junction transistors Q1 and Q2 implement a common mode voltage translator in front of the voltage comparators 11, 12, 13, 14.

Specifically, two current sources I1 and I2 are disposed in parallel downstream from a common voltage bias and are respectively coupled to the emitter of each PNP transistor Q1 and Q2 similarly arranged in parallel. The base of each PNP transistor Q1 and Q2 is coupled to a separate signal wire, while the collectors of the PNP transistor Q1 and Q2 are mutually tied to ground. The emitter of each PNP transistor Q1 and Q2 is further coupled to a separate input of the voltage comparators 11, 12, 13, 14.

With this arrangement, the PNP bipolar junction transistors Q1 and Q2 provide a DC level shift of approximately 650 mV over their base to emitter junctions while the current sources I1 and I2 provide the biasing mechanism for the PNP transistors Q1 and Q2 so that the ratio between the current amplitudes of the current sources I1 and I2 controls the thresholds of the comparators 11, 12, 13, 14. However, the current absolute magnitudes of the current sources I1 and I2 should be to a certain extent independent of process and temperature variations to obtain a predictable common mode level shift. For the high speed, binary receivers 5, which in this specific embodiment have a zero threshold, the two currents should be equal in amplitude (i.e., a value of approximately I1=I2=30 μA, with the bipolar transistors Q1 and Q2 being identical). In this manner, the binary receiver 5 outputs a binary 1 when Va≧Vb and outputs a binary 0 when Vb<Va. For the comparators 11, 12 of the ternary receivers 6, the desired threshold is implemented by precisely controlling the ratio between the current sources I1 and I2 for each comparator 11, 12. The current values for the first comparator 11 are I1=15 μa and I2=105 μa when Q2 is four times the size of Q1 so that it will output a binary 1 when Va≧Vb+98 mV and a binary 0 when Va<Vb+98 mV. Similarly, the current values for the second comparator 12 are I1=105 μa and I2=15 μa when Q1 is four times the size of Q2 such that the second comparator will outputs a binary 1 when Va≧Vb−98 mV and a binary 0 when Va<Vb−98 mV.

In general, the control over the ratio of two current sources I1 and I2 is very good in an integrated circuit manufacturing process. Specifically, in a standard CMOS manufacturing process, the front end PNP bipolar junction transistors Q1 and Q2 can be implemented as vertical substrate transistors without any process modifications. The offset thus implemented has a small variation with temperature due to the variation of the base-emitter junction voltages of the two PNP transistors with temperature. This variation is easily canceled by implementing an opposite temperature dependency for the two bias current sources I1 and I2.

Although the above-described level shifter is effective for many applications, particularly 5.0 V CMOS applications, problems can occur in implementing the level shifter in a 3.3 V CMOS system. As noted above, the level shift is provided to increase the common mode voltage by, for example, 650 mV to compensate for ground drop occurring on the twisted pair lines interconnecting the nodes. However, in a 3.3 V CMOS system, there may not be sufficient head-room on the current sources within the level shift of FIG. 2. For example, if the common mode input voltage is 2.7 V, then an increase of 650 mV is not possible since the high-voltage source is no more than 3.3 V. In a practical implementation, the power supply for a 3.3 V system may vary by as much as 10% and therefore may be as low as 3.0 V. Additionally, a 100 mV ground drop may occur on the chip, thereby yielding an even lower effective maximum voltage. Hence, the actual high voltage on the chip may be as low as 2.9 V. As can be appreciated, the amount of level shift feasible in a CMOS system having a high voltage of only 2.9 V is even less than in a true 3.3 V system.

Accordingly, it would be desirable to provide an improved level shifter which avoids the foregoing problem and it is to this end that aspects of the present invention are drawn.

BRIEF SUMMARY OF THE INVENTION

The invention relates to a level shifter for use in increasing a common mode voltage, particularly within a bus transceiver incorporating a high speed, binary transfer mode for the half-duplex transfer of data signals with a ternary control transfer mode having a full duplex dominant logic transmission scheme for the full duplex transfer of control signals. The invention is particularly adapted for use in a 3.3 V CMOS implementation of the bus transceiver. The level shifter determines the present common mode input voltage then selectively increases the common mode voltage level shift based on the input.

In accordance with an exemplary embodiment, the common mode level shifter includes a means for receiving a pair of signals having a common mode signal level and a means for determining whether the common mode input signal level exceeds a predetermined threshold. The level shifter also includes a means for increasing the common mode signal level by a predetermined amount, if the common mode signal level is found to be below the predetermined threshold. Also in accordance with the exemplary embodiment, the level shifter is employed within a bus transceiver receiving a bus signal having an idle phase, an arbitration phase, and a data phase. The shifting of the common mode level is done, if at all, only during the idle and arbitration phases. During the data phase, no level shifting is performed.

According to a further embodiment of the invention of the parent application, a method and apparatus, is provided for the full duplex transmission of arbitration signals in a particular multi-speed bus architecture scheme designed pursuant to the IEEE Standards Document P1394 entitled "High Performance Serial Bus" (draft 5.3 v1 of Oct. 14, 1992) which was appended to the parent application as Appendix A and which is also incorporated herein by reference.

By selectively applying the common mode level shift, the above-described problem occurring in 3.3 V CMOS implementations is overcome. Although the invention is advantageously exploited in the above-mentioned bus transceiver implemented using 3.3 V CMOS, principles of the invention may be applied to other systems and embodiments, and in particular to systems and embodiments having different high voltage levels. Hence, the general objective set forth above is achieved. Other objectives and advantages of the invention will be apparent from the following.

BRIEF DESCRIPTION OF THE DRAWINGS

The objects, features and advantages of the present invention will become apparent from the following detailed description in which.

DETAILED DESCRIPTION OF THE INVENTION

The present invention relates to a method and apparatus for implementing a level shift in a bus transceiver incorporating a high speed, binary transfer mode with a ternary control transfer mode having a full duplex dominant logic transmission scheme. In the following description, numerous details are set forth such as specific voltages, operating modes, etc., in order to provide a thorough understanding of the invention. However, these details may not be required to practice the present invention.

Figure 1:
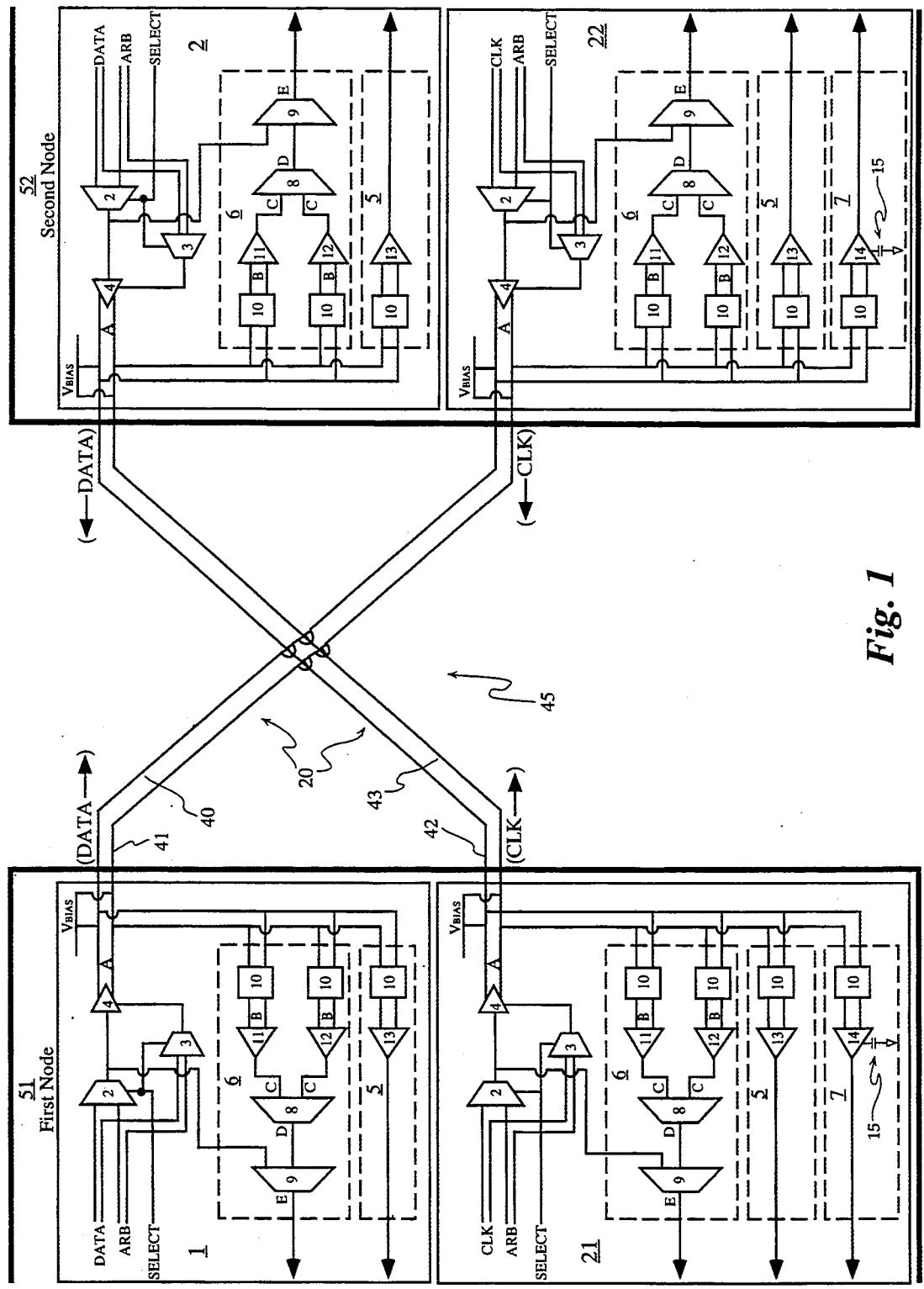
FIG. 1 is a block diagram showing two pairs of bus transceivers utilized for a differential serial bus described in the parent application wherein one pair of data/arbitration signaling transceivers comprise a binary receiver and a ternary receiver and another pair of clock signaling transceivers comprise a binary receiver, a ternary receiver and a preemptive signaling receiver.
Figure 2:
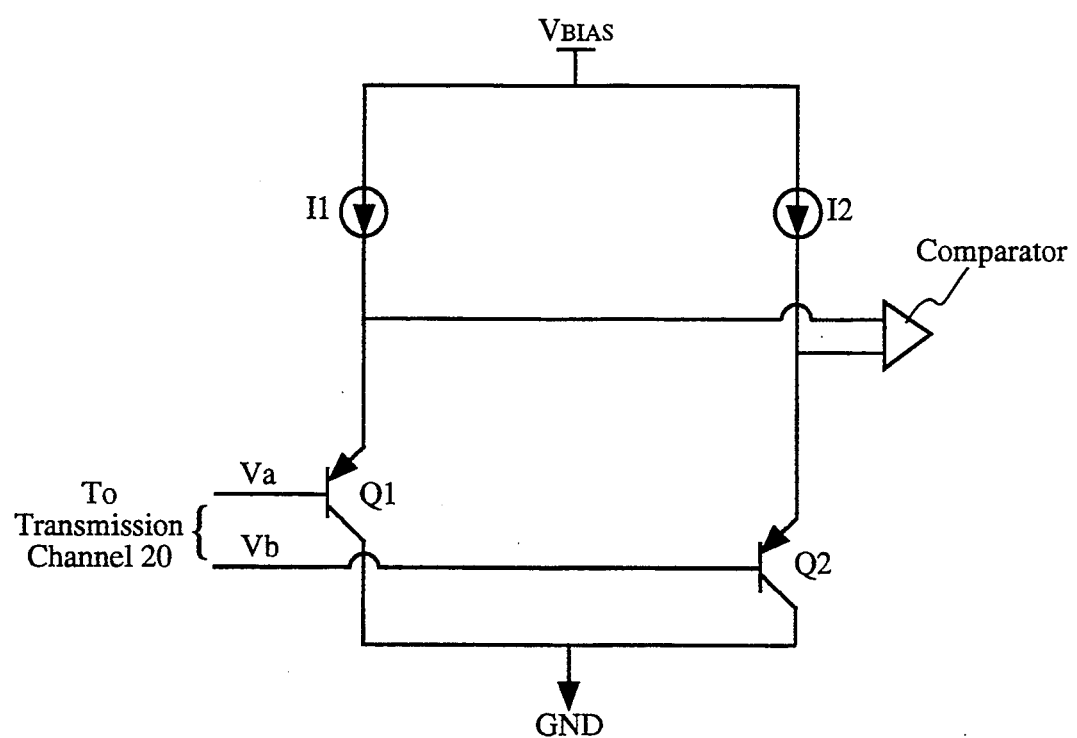
FIG. 2 is a diagram of the PNP level-shifting circuit used at the front end of each of the receivers of the bus transceivers of the FIG. 1.
Figure 3:
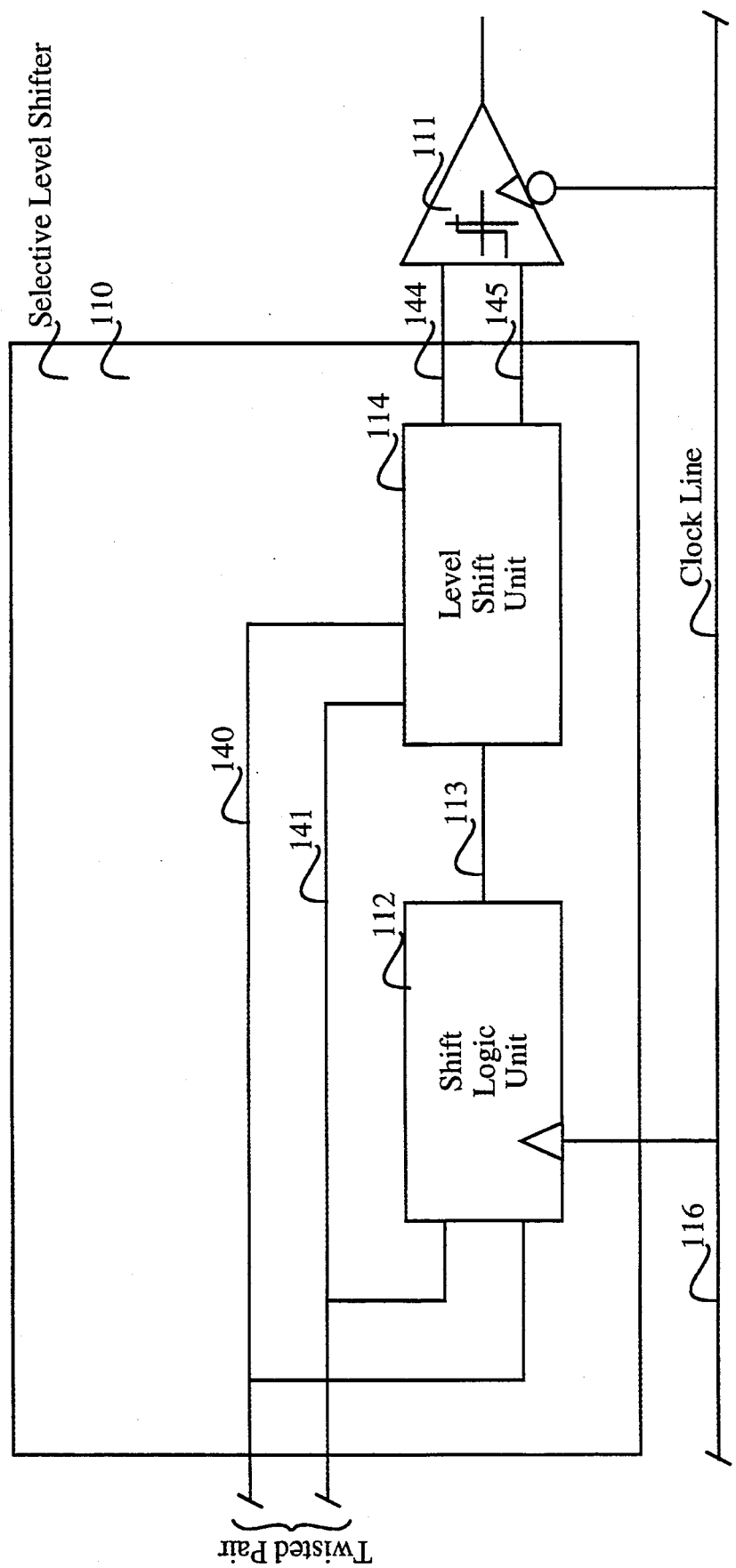
FIG. 3 is a block diagram of a level shifter configured in accordance with principles of the invention.

With reference to FIGS. 3–8, exemplary embodiments of the invention will now be described. FIG. 3 illustrates a level shifter 110 and an arbitration sampling comparator 111 with a fixed differential input offset. Level shifter 110 includes a shift logic unit 112 and a level shift unit 114, both of which receive signals on twisted pair lines 140 and 141 and a clock signal along line 116. Clock line 116 may provide, for example, a 50 MHz clock signal. In an exemplary embodiment, described below, wherein level shifter 110 and comparator 111 are employed within a bus transceiver configured in accordance with IEEE P1394 specifications, clock line 116 provides the 50 MHz clock signal only during an arbitration phase and an idle phase of the bus system. During a data packet transmission phase, the clock line provides a continuous high signal.

Whereas the level shifter of the parent application, described above, operates to provide a constant common mode level shift of, for example, 650 mV, level shifter 110 applies a selective level shift. More specifically, shift logic unit 112 determines the common mode voltage carried on lines 140 and 141 and compares the common mode voltage to a pair of predetermined threshold values. Shift logic unit 112 outputs a control signal to level shift unit 114 on line 113 causing level shift unit 114 to apply a common mode level shift to the signals received along lines 140 and 141. In this manner, the level shift is selectively performed based on the input common mode voltage value. Level shift unit 114 outputs the twisted pair signals, shifted or otherwise, to arbitration comparator 111. In the embodiment described below, wherein level shifter 110 is employed within a bus transceiver, the output of level shift unit 114 is also connected to a data packet receiver.

Arbitration unit 111 is a clocked comparator which samples signals on lines 144 and 145 only at the trailing or falling edge of the clock signal received along line 116. Shift logic unit 112 samples the common mode signal along lines 140 and 141 only on the leading or rising edge of the clock signal. Level shift unit 114 provides the common mode level shift, if at all, within one half of a clock cycle such that the level shift is complete before arbitration comparator 111 samples the twisted pair signals at the next trailing edge of the clock signal. In the exemplary embodiment wherein the clock rate is 50 MHz, the clock period is 20 nanoseconds and level shift unit 114 performs the level shift within 10 nanoseconds.

In an exemplary implementation, level shifter 110 is implemented using 3.3 V CMOS logic wherein the high voltage level, $V_{cc}$, may be as low as 2.9 V. Twisted pair lines 140 and 141 provide a common mode voltage which may vary within the range of 1.2 V to 2.6 V, hence, level shift unit 114 provides a 0.7 V level shift in response to the control signal received from shift logic unit 112. In one implementation, shift logic unit 112 merely determines whether the common mode voltage is above a threshold of 1.8 V and outputs a control signal in a first state if the common mode voltage is above 1.8 V and in a second state otherwise. Level shift unit 114 provides a 0.7 V level shift whenever the common mode voltage is below 1.8 V, but does not provide a level shift when the common mode voltage is above 1.8 V. However, if the common mode voltage tends to vary frequently within the vicinity of 1.8 V, frequent activation and deactivation of level shift unit 114 may result.

In a preferred implementation, shift logic unit 112 employs two threshold levels of 2.0 V and 1.6 V respectively. If the common mode voltage exceeds 2.0 V, then shift logic unit 112 provides an active control signal to level shift unit 114 to activate a 0.7 V level shift. If the common mode voltage falls below 1.6 V then shift logic unit 112 provides an inactive control signal to level shift unit 114 causing deactivation of any previous 0.7 V level shift. While the common mode voltage is between 2.0 V and 1.6 V, the state of the control signal does not change and level shift unit 114 therefore either continues to apply a level shift or to not apply a level shift, depending upon its previous state. In other words, a transition of the common mode voltage from above 2.0 V to below 2.0 V does not cause the level shift unit to activate a level shift. Likewise, a transition of the common mode voltage from below 1.5 V to above 1.5 V does not cause a deactivation of the common mode level shift.

Figure 4:
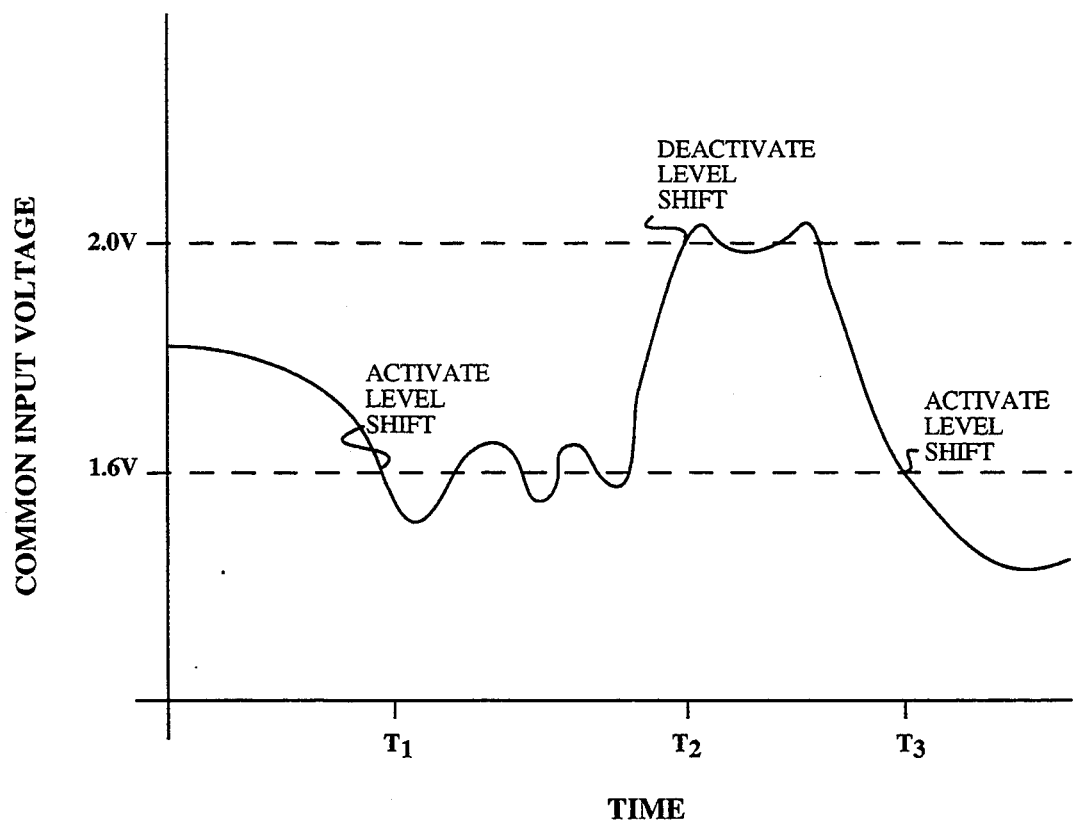
FIG. 4 is a graph illustrating a common mode input voltage as a function of time and particularly illustrating points in time when a common mode level shift is activated or deactivated.

As an example, illustrated in FIG. 4, the input common mode voltage varies from an initial level of 1.7 V to below 1.6 V, at time $T_1$, and then increases to above 2.0 V at time $T_2$. A 0.7 V level shift is applied beginning at time $T_1$ and is continuously applied until time $T_2$ at which time the level shift is deactivated. The input common mode voltage then drops from above 2.0 V to below 1.6 V at time $T_3$. The level shift remains deactivated until the voltage falls below 1.6 V, at which time the level shift is reactivated. It should be noted that no change in the state of the activation of the level-shift occurs between times $T_1$ and $T_2$ as a result of the input common mode voltage recrossing the 1.2 V threshold. Likewise, no change in the deactivated state of the level shift occurs between times $T_2$ and $T_3$ as a result of the input common mode voltage recrossing the upper threshold.

Thus, the application of the level shift depends both on the present voltage level of the input signal as well as on the immediate preceding state. By providing two threshold voltage levels and by activating and deactivating the level shift as described above, the activation or deactivation of the level shift does not occur frequently but occurs only as a result of a fairly significant swing in the input common mode voltage. As will be described below, a state machine is provided within shift logic unit 112 for facilitating application of the foregoing logic rules.

In the foregoing example, the upper and lower threshold values are 1.6 and 2.0 V respectively. In other implementations, different threshold levels may be applied. Furthermore, additional thresholds may be employed with more complicated logic applied to transitions above or below the various threshold levels. For example, a level shift unit may be provided which selectively provides different amounts of level shift with the shift logic unit providing a signal which not only indicates whether a level shift should be applied but also indicates the amount of level shift to be applied. As can be appreciated, the principles of the invention may be applied in a wide range of applications for selectively applying a common mode level shift.

Figure 5:
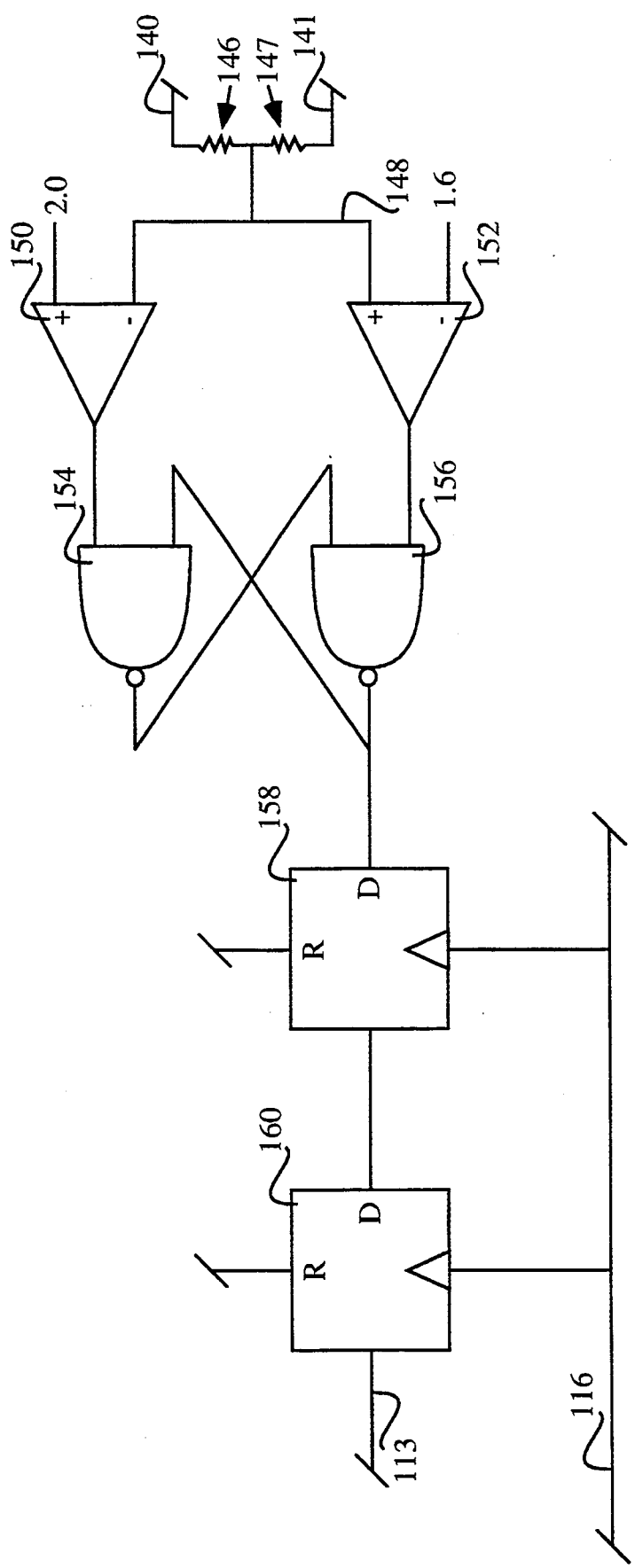
FIG. 5 is a block diagram, partially in schematic form of a logic unit of the level shifter of FIG. 3.

FIG. 5 illustrates a circuit suitable for use as shift logic unit 112. In the circuit of FIG. 5, a pair of resistors 146 and 147 interconnect input signal lines 140 and 141, respectively, to a common mode line 148. In the exemplary 3.3 V CMOS system, resistors 145 and 146 may be 15 kilo-ohm N-well resistors. Current conducted through the resistors combines to yield a current along line 148 having the common mode voltage. The common mode voltage is applied to the negative input of a first differential comparator 150 and to the positive input of a second differential comparator 152. Comparator 150 also receives a 2.0 V signal as a positive input. Comparator 152 also receives a 1.6 V signal as a negative input. Outputs of comparators 150 and 152 are applied to a pair of cross-coupled NAND gates 154 and 156, the output of which is routed through a pair of rising-edge-triggered and D-clocked flip-flops 158 and 160. The cross-coupled NAND gates provide a state machine for maintaining the state of the level shift control signal. The output of D flip-flop 160 provides the control signal along line 113 (also referred to herein as "level shift#") for controlling level shift unit 114 (FIG. 3).

With this configuration, if the common mode voltage along line 148 exceeds 2.0 V, then comparator 150 outputs a low signal while comparator 152 outputs a high output signal. The application of the low and high output signals to cross-coupled NAND gates 154 and 156 causes the NAND gate to output an active low signal. If the voltage on common mode line 148 is below 1.6 V, then comparator 150 outputs a high signal and comparator 152 outputs a low signal and NAND gates 154 and 156 output an inactive high signal.

However, if the common mode voltage is between the 2.0 V and 1.6 V then both comparators 150 and 152 provide a high output signal 152. The application of a pair of high signals to cross-coupled NAND gates 154 and 156 results in an output signal which maintains the previous output state of the NAND gates. For example, if the NAND gates provide an inactive high output signal, and the common mode voltage drops from above 2.0 V to below 2.0 V, then the output of the NAND gates remains in active high. However, if the voltage continues to drop and falls below 1.5 V, then the output of the NAND gates switches to an active low, indicating a need to provide a common mode level shift. If the common mode voltage then rises from below 1.6 V to between 1.6 and 2.0 V, no change in the output of the NAND gates occurs. If the change in the common mode voltage eventually rises above 2.0 V, then the output of the NAND gates switches state to a inactive high signal, indicating the need to deactivate the level shift.

The states of the cross coupled NAND gates are set forth in Table I.

TABLE I

| Common Mode Values (X) | Comparator 150 | Comparator 152 | NAND Gate Output |
|---|---|---|---|
| X > 2.0 | L | H | L |
| 1.6 ≦ X ≦ 2.0 | H | H | Same State |
| X < 1.6 | H | L | H |

D flip-flop 158 synchronizes the output signal from the cross-coupled NAND gates to the clock signal provided along line 116. D flip-flop 160 is provided to avoid meta-stability problems which can occur if a change in state of the output signal from the NAND gates coincides with an edge of the clock signal provided along line 116.

Figure 6:
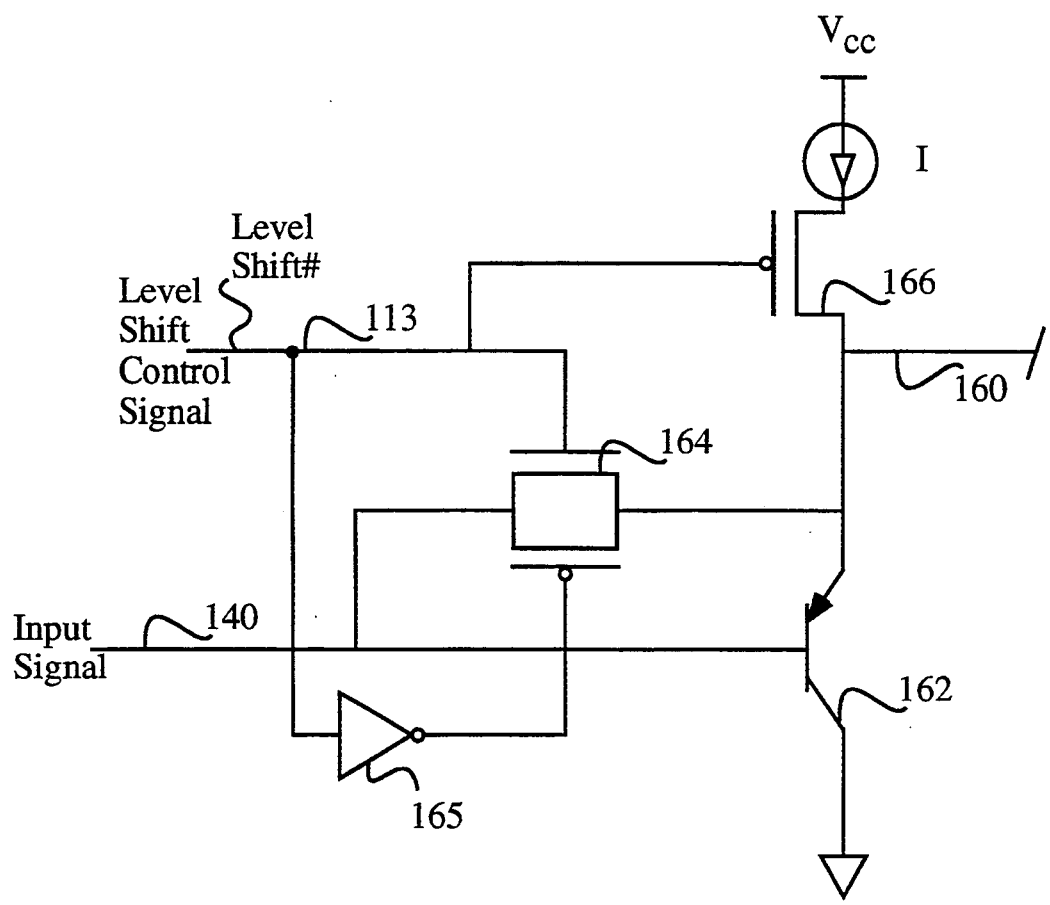
FIG. 6 is a circuit schematic of a first embodiment of a portion of the level shift unit of the level shifter of FIG. 3.

FIG. 6 illustrates a portion of level shift unit 114 and, in particular, illustrates a switch mechanism for providing a selective level shift to line 140. A similar switch is provided for input signal line 141. The switching circuitry operates to provide a 0.7 V increase in voltage in a signal received along line 140 as output on line 160. The level shift is performed only when a level shift control signal received along line 113 is in an active low state. The 0.7 V level shift is provided by a transistor 162 by applying the input signal along line 140 to the base of transistor 162. The collector of transistor 162 is connected to ground. Selective switching of the level shift is provided by a pass-gate 164 and an CMOS transistor 166. Pass-gate 164 includes a P-channel and an N-channel transistor. The level shift control signal, level shift# is applied to the gate of the N-channel transistor and is supplied through an inverter 165 to the gate of the P-channel transistor. With the level shift control signal in an active low state, pass-gate 164 is off and transistor 166 is on, thereby allowing current I to flow from the high voltage source to ground through transistor 162. Accordingly, the output signal along line 160 follows the input signal along line 140 but has a voltage of, for example, 0.7 V higher.

If the level shift signal is in an inactive high state, then pass-gate 164 is on and transistor 166 is off allowing signals to flow directly from input line 140 to output line 160, bypassing transistor 162. Accordingly, no level shift occurs and no current flows through 162.

Thus, FIG. 6 illustrates an exemplary switching circuit for providing a level shift selectively based upon the level shift control signal. As noted above, level shift unit 114 of FIG. 3 actually includes two sets of switches such as illustrated in FIG. 6 with both switches receiving the level shift control signal along line 113 but with one switch receiving an input signal along line 140 and the other receiving an input signal along line 141. Corresponding separate output lines are also provided.

Figure 7:
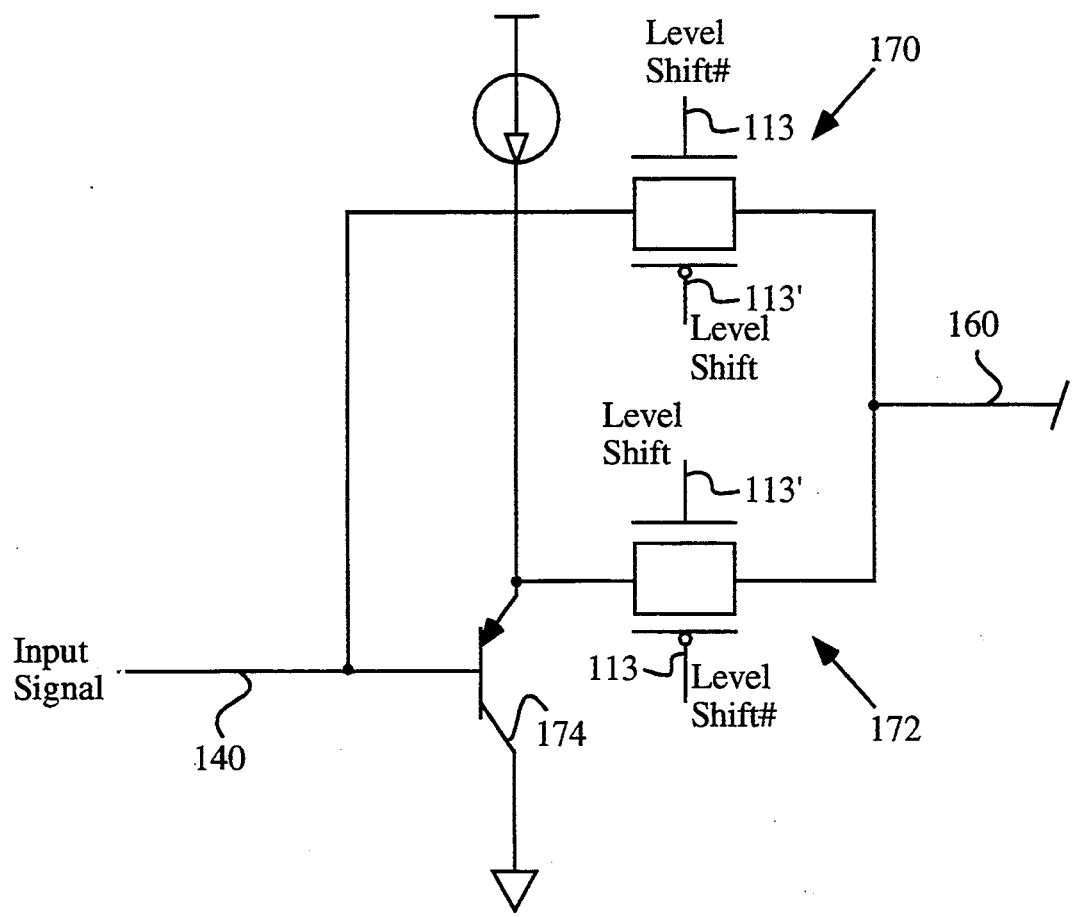
FIG. 7 is a circuit schematic of a second embodiment of a portion of the level shift unit of a level shifter of FIG. 3.

Other implementations of the switching circuitry may be provided in accordance with the principles of the invention. One such alternative implementation is illustrated in FIG. 7. The switching circuitry of FIG. 7 includes a pair of pass gates 170 and 172 along with a transistor 174, interconnected as shown. Pass gates 170 and 172 each receive both the level shift control signal and an inverted level shift# control signal. Inverters necessary for inverting the level shift control signal are not separately shown. In FIG. 7, input lines providing the level shift control signal are denoted 113 whereas input lines providing the inverted level shift control signal are identified by 113'. Because the level shift# control signal is an active low signal, pass gate 172 is open and pass gate 170 is closed while the level shift# signal is high. This allows the input signal along line 140 to pass through to output line 160 without a level shift. However, while the level shift# signal is low, pass gate 172 is closed and pass gate 170 is open. This allows the signal to flow from input line 140 through transistor 174 and pass-gate 172 onto output line 160, with transistor 174 thereby providing a voltage level shift.

While the foregoing describes an arbitrary level shifter for use with any twisted pair signal lines, the following describes a particular implementation of the level shifter of the invention adapted for use with a bus system employing IEEE P1394 bus protocol as it is defined in the Appendix of the parent application.

Figure 8:
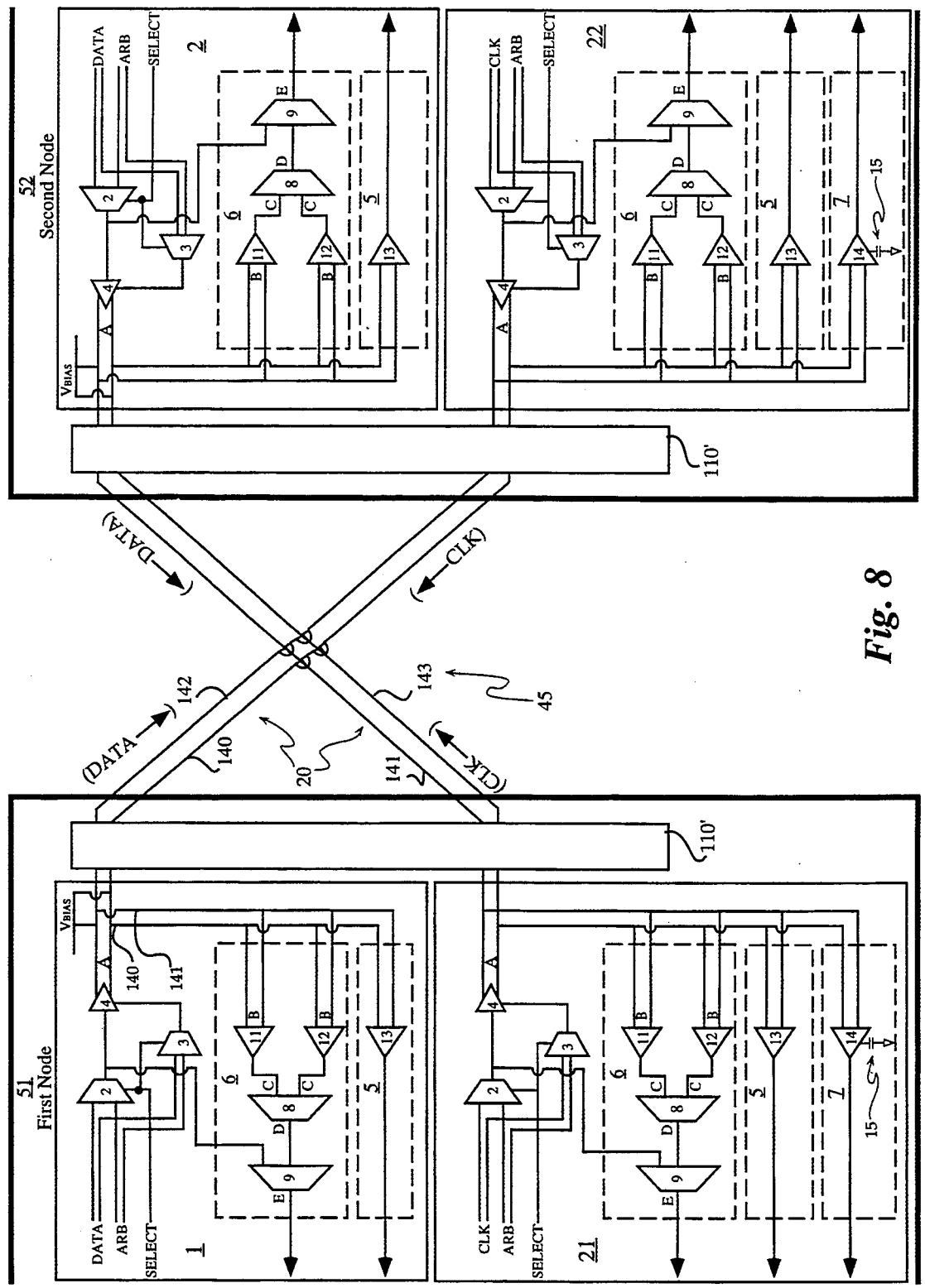
FIG. 8 is a block diagram of the transceiver of FIG. 1, but configured with the selective level shifter of FIGS. 3–7.

FIG. 8 illustrates the bus transceiver described in the background of the invention section above but modified to incorporate a level shifter 110'. Level shifter 110' is similar to level shifter 110, described above, but operates on two pairs of twisted pair lines, namely lines 140 and 141 and lines 142 and 143. Accordingly, within level shifter 110', a total of four of the individual switching mechanisms illustrated in FIGS. 6 or 7 are provided. The switching mechanisms provide the same amount of level shift to each line.

The level shift is based solely on the common mode voltage upon lines 143 and 141. A level shift is also performed on lines 140 and 142 to help ensure that any propagation delay occurring along lines 141 and 143, as a result of level shifting, is the same as on lines 140 and 142. It should be noted that the common mode voltage on lines 142 and 140 do not vary significantly because the common mode bias is provided locally by the transceiver. In other words, for first node 51 common mode bias, signals along lines 143 and 141 are received from second node 52, whereas signals along lines 142 and 140 are output from first node 51. The common mode voltage on the 143 and 141 lines may therefore vary as a result of ground drops between 51 and 52 whereas the common node voltage on lines 142 and 140 is not effected by ground drops and does not vary significantly.

It should also be noted here that the level shifter of FIG. 8 is employed only for shifting signals input to the arbitration comparators and packet receiver of the bus transceiver, not the driver output signals. The selective level shifting is performed during the idle and arbitration phases. The level shift is not changed during the data phase. This is accomplished by forcing the clock signal high during the data phase. Other techniques may be employed for activating level shifter 110' only during the idle and arbitration phases and for deactivating level shifter 110' during the data phase.

The idle, arbitration and data phases of the signal are described more fully in the IEEE P1334 specifications which are incorporated by reference herein. The level shift is not changed during the data phase signals, in part, because it has been found that the common mode signal does not vary significantly during the relatively short data phase. In an exemplary system, data is transmitted at a rate of about 200 megabits per second with a data packet lasting at most 90 microseconds. Given the short data transmission time, significant changes in common mode voltage do not occur. Moreover, it has been found that in attempt to implement a common mode shift during the data phase could result in come discontinuities in the received signal resulting in jitter and possible disruption of the received data. Therefore it is not necessary to perform a level shift during the data phase. Moreover, in the bus transceiver of FIG. 8, the comparators for the data signals are unclocked comparators which sample the data phase signals continuously. As such, a level shift change cannot be made to the continuously sampled data signals, such could result in some discontinuities in the received signal resulting in jitter and possible disruption of the received data.

The level shift can be changed during the idle and arbitration phases because, as discussed above, the signals of those phases are sampled by clocked comparators such that a level shift may be performed during the period between successive sampling times. In other embodiments, however, principles of the invention may be exploited to provide a selective level shift to data phase signals as well as to arbitration and idle signals and may also be applied to signal transmission systems which do not have distinct idle arbitration and idle phases.

Figure 9:
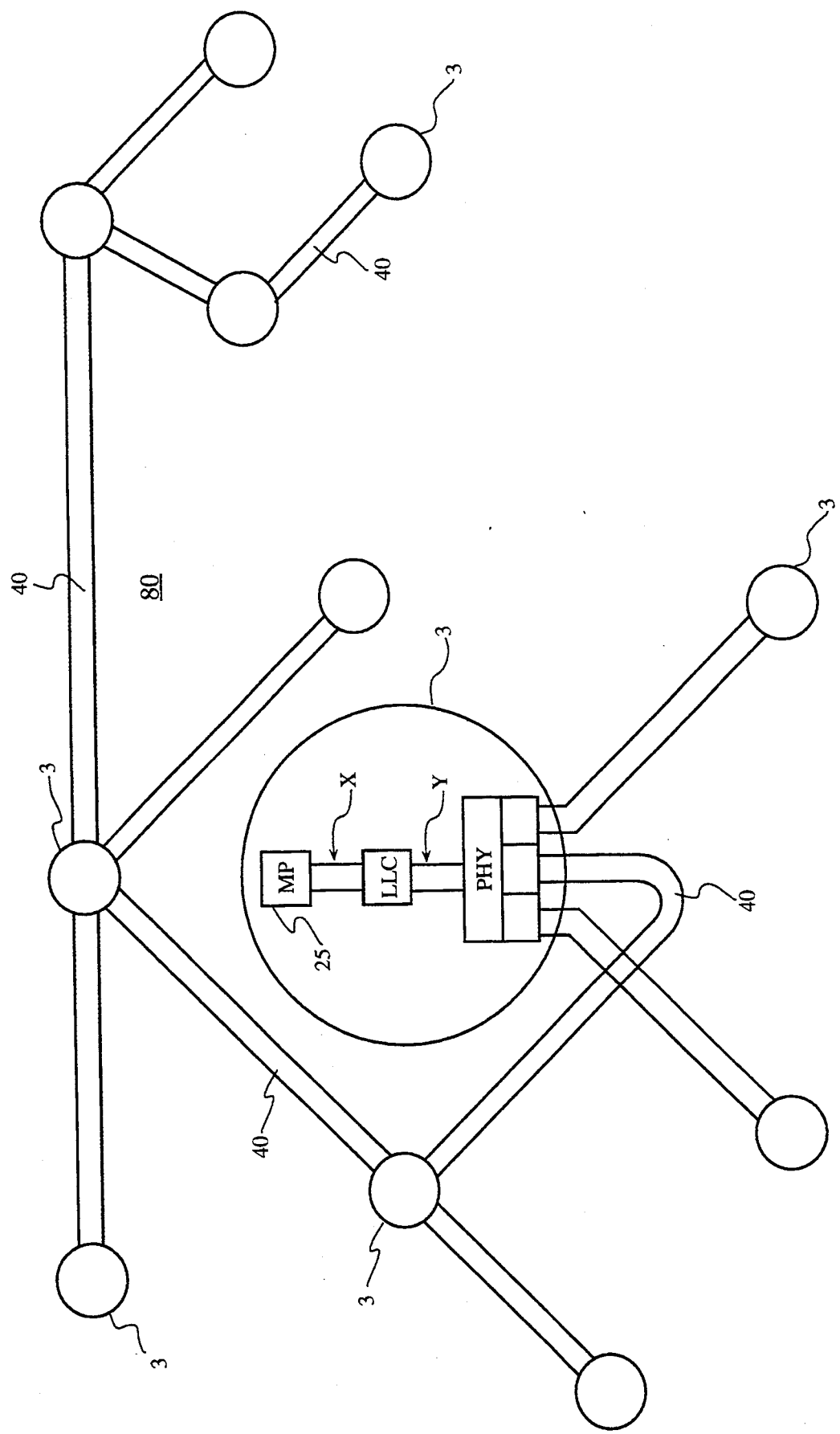
FIG. 9 is a block diagram showing a plurality of nodes interconnected in an arbitrary bus topology pursuant to the P1394 bus architecture standard, wherein the bus transceivers of FIG. 8 are incorporated in adjacent nodes.

FIG. 9 illustrates a bus system having a plurality of nodes, each of which includes a bus transceiver as illustrated in FIG. 8 and including the level shifter 110'. As shown in FIG. 9, a plurality of nodes 3 of a computer system are arbitrarily coupled together via a plurality of links 40 to form an interconnected, multi-speed bus 80. In this embodiment, each link 40 comprises a differential twisted pair, serial bus 45 as described. Additionally, each node 3 coupled to the interconnected, multi-speed serial bus comprises a physical channel interface chip (or "PHY") directly connected to the serial bus for the reception and transmission of control and data signals. Each node 3 also comprises a link layer chip (or "LLC") which transmits to and receives from the PHY both data and control signals via a fixed speed, variable size bus Y forming a scalable interface. The LLC also interfaces with the local host 25 (i.e., a microprocessor MP) of the node via a fixed speed, fixed size bus X in order to process the data received from the PHY.

With such an arrangement, the interconnected pairs of bus transceivers 1, 22 and 2, 21 (shown in FIG. 8) are respectively utilized in adjacent nodes 3 of the system. In this manner, the transmission of data signals between PHY's of adjacent nodes 3 is performed using the binary transfer mode and the transmission of control signals is performed using the ternary transfer mode as described above. Furthermore, in the specific P1394 implementation, the PHY circuits are supplied with power via the links 40 which contain, in addition to the communication channels 20, a voltage distribution line and a ground connection line. Although this power distribution architecture may cause a significant voltage difference in the ground potential between two adjacent nodes 3, the use of the level shifting circuits 10 of the present invention advantageously solves this problem.

Thus, what has been described is an improved level shift circuit particularly adapted for use in a bus transceiver for a bus system implementing IEEE P1394 bus protocol. The improved level shifter selectively provides a common mode level shift based upon the input common mode voltage level. Although the improved level shifter has been described with reference to specific exemplary embodiments, principles of the invention may be exploited in other embodiments and for other applications as well. Accordingly the exemplary and illustrative embodiments described herein should not be construed as limiting the scope of the invention.

We claim:

1. A common mode level shift circuit comprising:
   means for receiving a pair of signals;
   means for determining a common mode signal level for said pair of signals;
   level shift means for increasing said common mode signal level of said pair of signals by a predetermined amount;
   means for determining whether said signals, if increased by said predetermined amount, exceed a predetermined threshold; and
   means, responsive to said means providing a common mode voltage, for controlling operation of said level shift means to increase said common mode signal level by said predetermined amount if said increased common mode level does not exceed said predetermined threshold.

2. A method for shifting a common mode signal level, said method comprising the steps of:
   receiving a pair of signals having a common mode signal level;
   determining whether an increase in said common mode signal level by a predetermined amount would exceed a predetermined threshold; and
   increasing said common mode signal level by said predetermined amount, only if said increase does not exceed said predetermined threshold.

3. A method for shifting a common mode signal level using a circuit for increasing the common mode signal level for a pair of signals by a predetermined amount, said method comprising the steps of:
   receiving a pair of signals having a common mode signal level;
   determining said common mode signal level from said pair of signals;
   comparing said common mode signal level to a first threshold and if said common mode signal level falls below said first threshold and said circuit for increasing said common mode signal level is not active, then activating said circuit for increasing said common mode signal level of said pair of signals by said predetermined amount; and
   comparing said common mode signal level to a second threshold which is greater than said first threshold level and if said common mode signal level rises above said second threshold and said circuit for increasing said common mode signal level is active, then deactivating said circuit for increasing said common mode signal level of said pair of signals by said predetermined amount.

4. A method for shifting a common mode signal level using a circuit for increasing the common mode signal level for a pair of signals by a predetermined amount, within a bus system providing arbitration phase signals and data phase signals and wherein said arbitration signals are sampled periodically and said data signals are sampled continuously, said method comprising the steps of:
   receiving a pair of signals having a common mode signal level;
   determining whether said signal is in said arbitration phase or said data phase; and
   if not in said data phase, then
   determining said common mode signal level from said pair of signals;
   comparing said common mode signal level to a first threshold and if said common mode signal level falls below said first threshold and said circuit for increasing said common mode signal level is not active, then activating said circuit for increasing said common mode signal level of said pair of signals by said predetermined amount; and
   comparing said common mode signal level to a second threshold which is greater than said first threshold level and if said common mode signal level rises above said second threshold and said circuit for increasing said common mode signal level is active, then deactivating said circuit for increasing said common mode signal level of said pair of signals by said predetermined amount.

5. A common mode level shift circuit comprising:
   a pair of input signal lines;
   a common mode detection circuit connected to said pair of input lines;
   a first differential comparator having a first input connected to a first voltage level and having a second input connected to said common mode detection circuit;
   a second differential comparator having a first input connected to a second voltage level and having a second input connected to said common mode detection circuit, wherein said first voltage level is greater than said second voltage level;
   first and second NAND gates, with said first NAND gate receiving an output from said first comparator and an output from said second NAND gate and with said second NAND gate receiving an output from said second comparator and an output from said first NAND gate;
   a level shift circuit coupled to said pair of input signal lines and receiving the output signal from said second NAND gate and providing a level shift by a predetermined amount to signals present on said pair of input signal lines depending upon the state of the signal output from said second NAND gate.

6. The common mode level shift circuit of claim 5, wherein said level shift circuit provides said level shift while said output signal of said second NAND gate is in a low state and provides no level shift while said output signal of said second NAND gate is in a high state.

7. A common mode level shift circuit comprising:
   a pair of input lines;
   a common mode detection circuit connected to said pair of input lines;
   a level shifter connected to said common mode detection circuit and to said pair of input lines;
   a shift logic unit, connected to said level shifter and to said common mode detection circuit, said shift logic unit having circuitry to determine whether a common mode signal level of signals received along said pair of input lines would exceed a predetermined threshold if increased by said level shifter by a predetermined amount; and
   a level shift unit connected to said common mode detection circuit and to said shift logic unit, said level shift unit having circuitry to control operation of said level shifter to increase said common mode signal level of said pair of input lines by said predetermined amount if said increased common mode signal level does not exceed said predetermined threshold.

* * * * *